United States Patent [19]
Buzy-Vigneau

[11] Patent Number: 5,062,544
[45] Date of Patent: Nov. 5, 1991

[54] AUTOMATIC DISPENSER FOR BAKERY PRODUCTS AND THE LIKE

[75] Inventor: Jean-Paul Buzy-Vigneau, Longwy, France

[73] Assignee: Lorraine Distribution Buzy-Vigneau, Longway, France

[21] Appl. No.: 401,124

[22] Filed: Aug. 31, 1989

[51] Int. Cl.[5] .......... B65G 59/00
[52] U.S. Cl. .......... 221/130; 221/298
[58] Field of Search .......... 221/129, 126, 127, 131, 221/130, 123, 298, 289

[56] References Cited

U.S. PATENT DOCUMENTS 3,105,610 10/1963 Aidlin et al. .......... 221/298
4,483,459 11/1984 Taylor et al. .......... 221/130
4,591,070 5/1986 Wirstlin .......... 221/129

*Primary Examiner*—Robert P. Olszewski
*Assistant Examiner*—Kenneth Noland
*Attorney, Agent, or Firm*—Weiser & Stapler

[57] ABSTRACT

An automatic dispenser dispenses individual items which may not be of a uniform shape, such as bakery products. The items to be dispensed are disposed on an inclined plate having a rocker pivotably mounted at the lower end. A retaining tongue is mounted adjacent to the rocker to prevent the movement of items from the inclined plate into the rocker. When one item is to be dispensed, the retaining tongue is lowered to restrict the motion of the items on the inclined plate while the item in the rocker is tilted out of the rocker to be made accessible to the user.

20 Claims, 5 Drawing Sheets

AUTOMATIC DISPENSER FOR BAKERY PRODUCTS AND THE LIKE

The present invention relates to an automatic dispenser for bakery products, particularly for special loaves of bread.

Automatic dispensers today embrace a very wide and highly varied range of appliances making it possible to dispense products of various forms, from a cigarette pack to a baguette and including books of postage stamps, confectionery, etc.

There are already known dispensers where the product samples are stacked on top of one another in a compartment, the first sample of the stack, located at the lower end of the compartment, being seated in a drawer which the user can open, after inserting the appropriate sum in the machine, thereby having access to the sample. When he closes the drawer again the samples which were on top fall and the next sample takes its place in the drawer.

Another type of dispenser comprises a horizontal conveyor, to which grippers are fastened behind one another and support in pairs the product samples. As soon as the appropriate sum has been inserted in the machine, the foremost pair of grippers opens, thus freeing the sample which falls into a container accessible to the user by means of a flap which is released. The conveyor then starts to move so as to position the next sample above the container.

Yet another type of dispenser comprises a horizontal helical transporter, in which the samples are arranged one behind the other, each sample being positioned between two turns of the transporter and resting on a plate located underneath the said transporter and set back relative to the first turn. The insertion of an appropriate sum into the dispenser commands the rotation of the helical transporter through a complete revolution, thereby advancing the product sample by one turn. The first sample of the series, being advanced in the first tun in this way, falls into a container accessible to the user by means of a flap which is released.

However, the abovementioned dispensers scarcely offer, if at all, an adjusting device making it possible to match the dispenser to products of varied shapes and sizes. The present invention aims to overcome these disadvantages by providing an automatic dispenser which makes it possible to dispense an entire range of products of various shapes and sizes, particularly bakery products such as special loaves of bread, which generally take the form of short loaves, square loaves or round loaves, and croissants, brioches, chocolate-coated loaves or similar products collected in bags.

The automatic dispenser according to the invention is illustrated in the accompanying drawing in which.

FIGS. 5*a* to 5*d* show diagrammatic sectional views of the various operating steps of the dispenser according to the invention.

Figure 1:
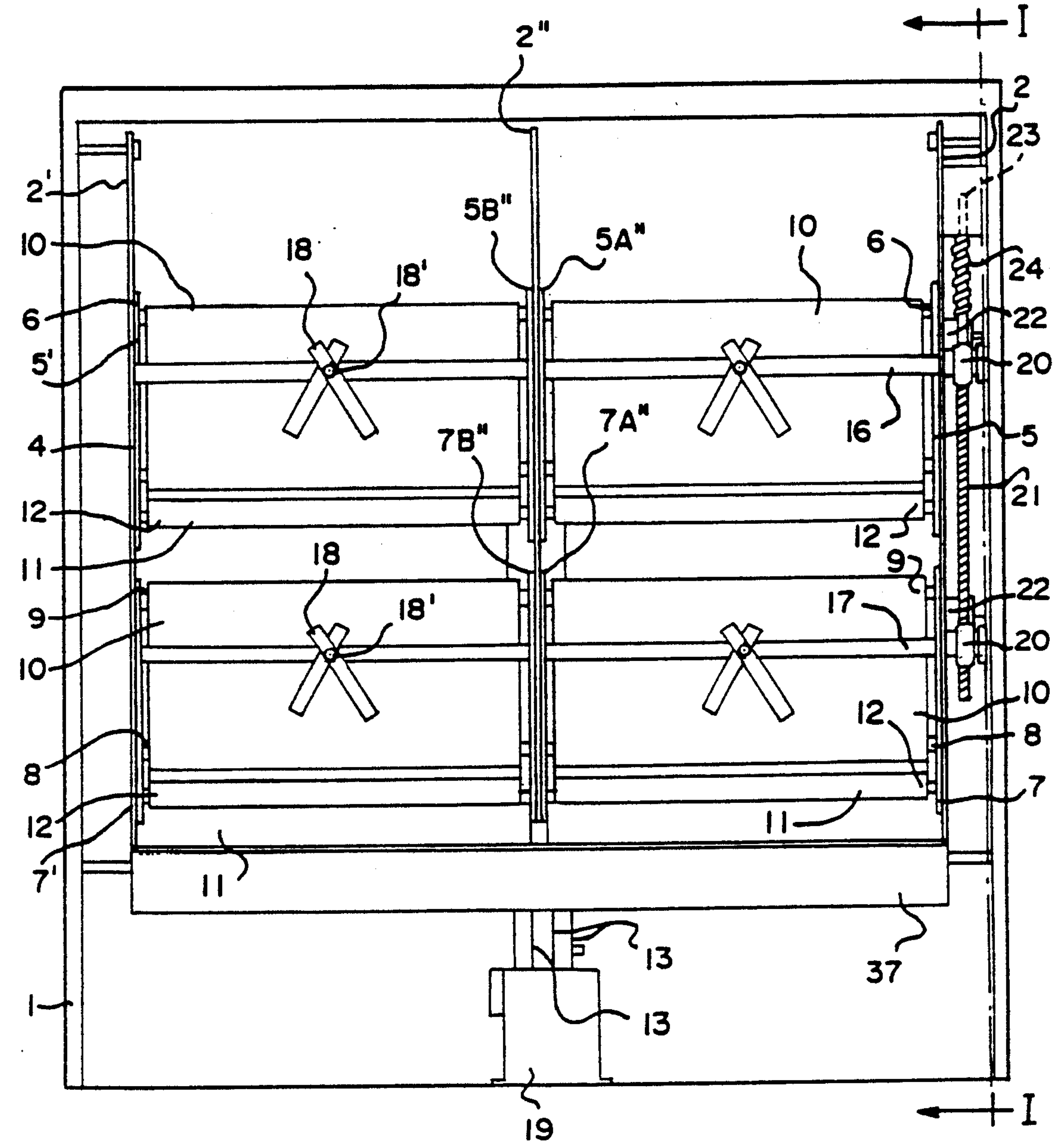
FIG. 1 shows a front view of the open appliance.
Figure 2:
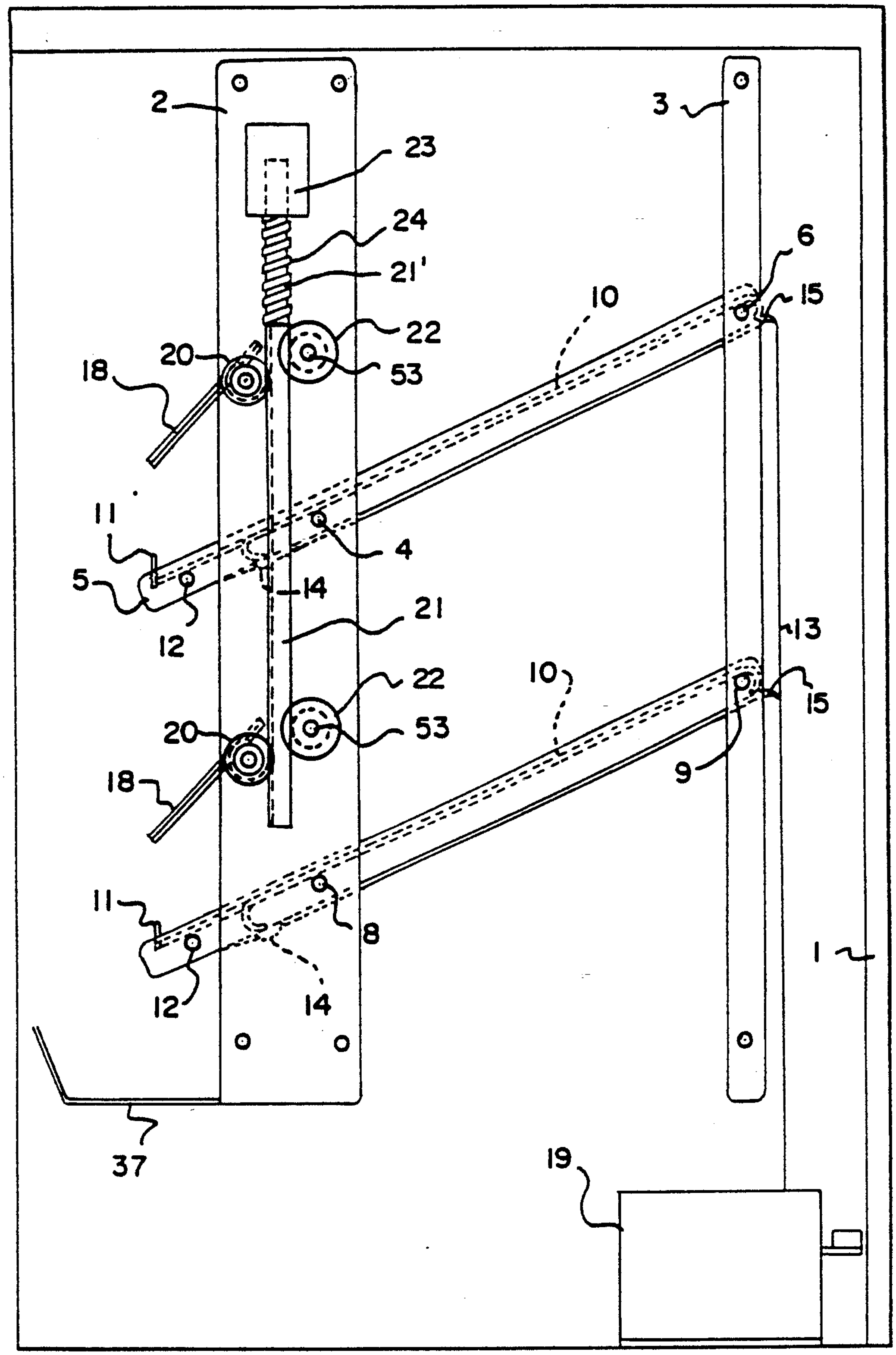
FIG. 2 shows a section along the line I—I of FIG. 1 on a larger scale.

Referring to FIGS. 1 and 2, it can be seen that the automatic dispenser according to the invention consists of a frame 1, the side walls of which support, by means of screws and bolts, two sets of two vertical supports 2, 2′ and 3, 3′ of which one 2, 2′ is located in front of the second 3, 3′.

Two axles 4, 8 and 6, 9 respectively, located one below the other and fixed at each of their ends to the supports 2, 2′ and 3, 3′ respectively, carry plates 10 on which the stored product samples are arranged. The plates 10, inclined so as to cause the product samples to slide towards their front end, are arranged in two rows of two plates separated from one another by means of two middle supports 2″ and 3″ supported by the axles 4, 8 and 6, 9 respectively, the plates 10 of the upper row being supported by the axles 4 and 6 and the plates 10 of the lower row by the axles 8 and 9.

Located at the front end of each of the plates 10 is a rocker 11 intended for carrying the product sample to be dispensed.

Two rods 5, 7 and 5′, 7′ respectively, parallel to one another and arranged one above the other are fixed to the supports 2, 3 and 2′, 3′ respectively by means of the respective axles 4, 6 and 8, 9.

The rod 5 is connected to a rod 5″A fastened to the middle supports 2″ and 3″ by means of a horizontal axle 12 fixed to the lower face of the corresponding rocker 11. The same is true of the rod 5′ connected to a rod 5″B. In the same way, the rods 7 and 7′ are connected to two rods 7″A and 7″B, each of the axles 12 being mounted pivotably at its ends on the corresponding rods.

Each axle 12 is connected, by means of a cable 13 passing via guides 14 and 15 fixed to the lower face of the plates 10, to a control housing 19 located in the lower part of the appliance under the support 3″.

A container 37 positioned under the lower rockers 11 and in front of the said rockers and fixed to the supports 2 and 2′ makes it possible to receive the discharged product sample and make it available to the user.

Two horizontal axles 16 and 17 are mounted pivotably on the supports 2 and 2′ at a short distance above the front end of the plates 10 and pass through the middle support 2″ via an orifice (not shown).

Fastened to each of the axles 16 and 17 by means of screws 18′ are retaining tongues 18 consisting of two tongues joined together at their upper end in a V-shaped manner, distributed on the basis of one set of two tongues above each rocker, their spacing making it possible selectively to change their height and their effective width as a function of the product to be dispensed, and furthermore each of the axles 16 and 17 is fixed at one of its ends to a toothed pinion 20 located between the frame 1 and the support 2 and engaging with a rack 21 by means of a guide roller 22 fixed to the support 2 by means of a pivot 53.

The rack 21 is accommodated between the pinions 20 and the guide rollers 22 and is extended in its upper part by a cylindrical rod 21′, the end of which is seated in an electromagnet 23 fixed to the support 2 and equipped with a retention stop (not shown) for retaining the rack 21 and performing the function of raising the rack 21 over a distance of a few centimetres. That part of the cylindrical rod 21′ located outside the electromagnet 23 is seated in a spring, of which one end is in contact with the electromagnet 23 and the other end in contact with a shoulder formed in the rack 21.

Figure 3:
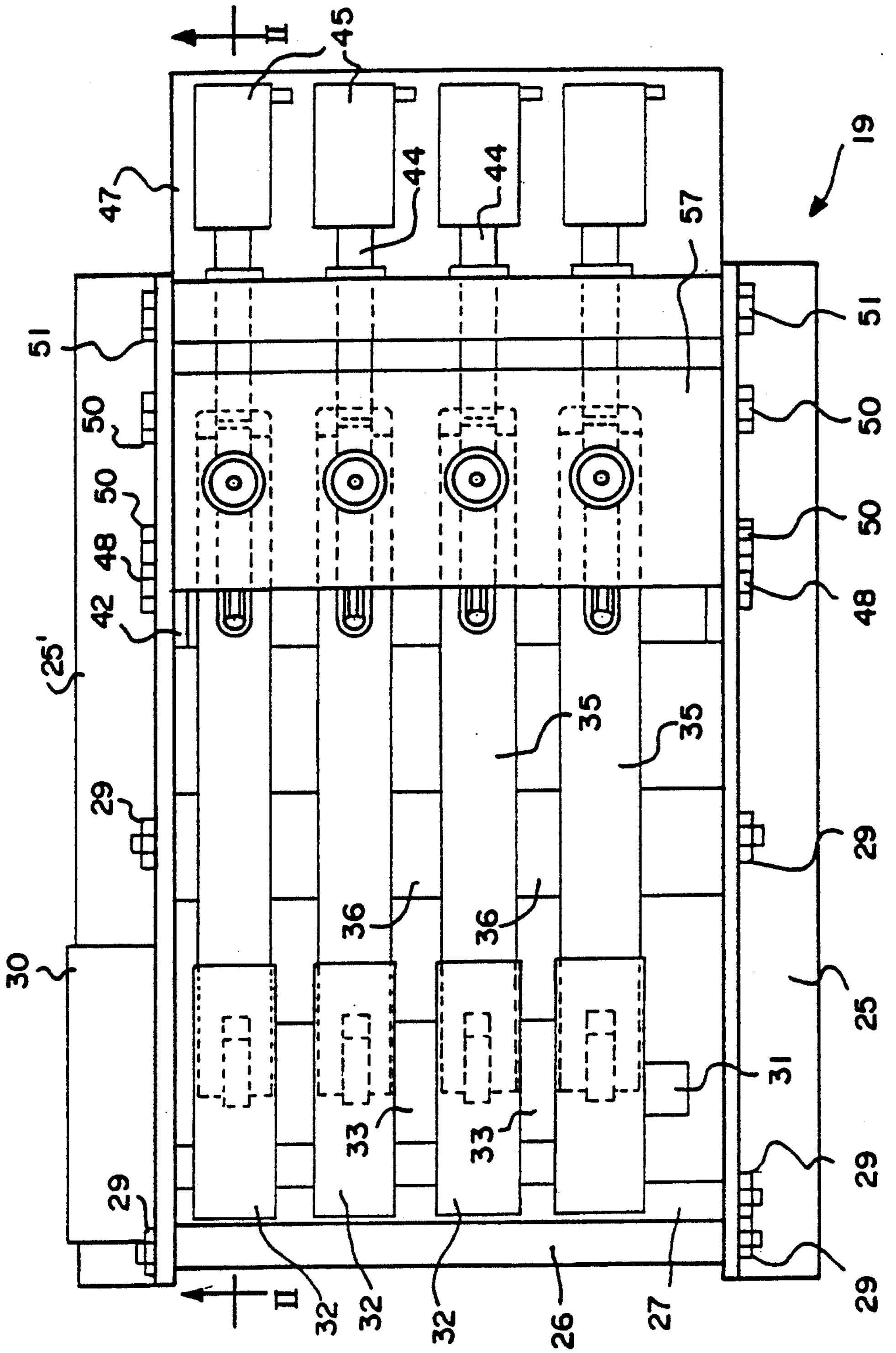
FIG. 3 shows a top view of the control housing on a larger scale.
Figure 4:
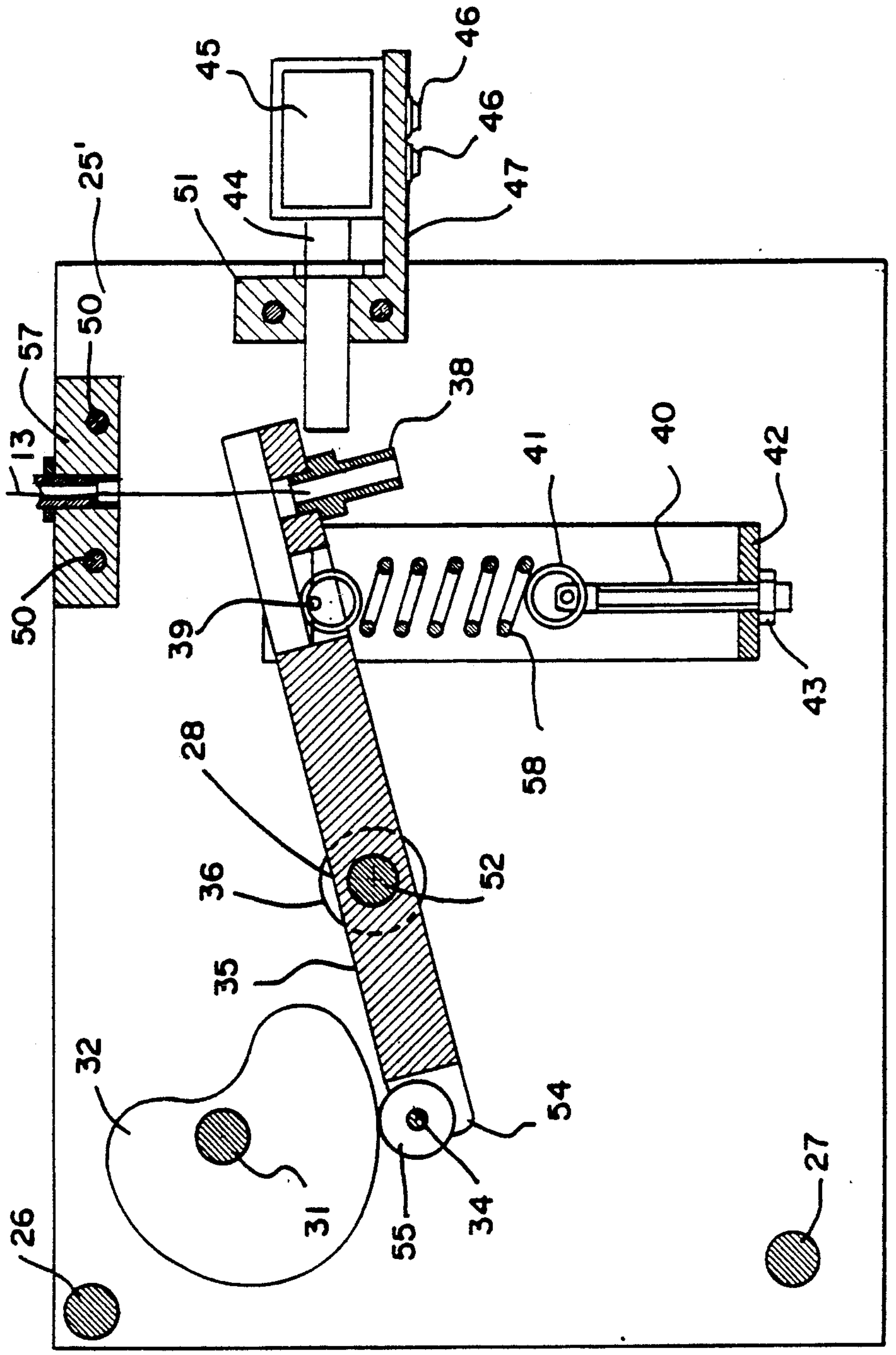
FIG. 4 shows a section along the line II—II of FIG. 3.

Referring to FIGS. 3 and 4, it will be seen that the control housing 19 consists of two support plates 25 and 25′ connected to one another by means of two horizontal bars 26, 27 and a horizontal axle 28, the ends of which are fixed to the supports 25 and 25, by means of nuts 29. A rotor (not shown) of a motor 30 fixed to the front part of the outer face of the support 25' is fixed to a transfer shaft 31, to which are fastened four cams 32 separated from one another by spacers 33. Each cam 32 is in contact, in its lower part, with a roller 55 which is seated in a notch 54 machined at one end of a lever 35 perpendicular relative to the shaft 31 and which is fixed to this lever 35 by means of a pivot 34, the lever 35 being mounted pivotably about the axle 28.

Fastened to the other end of the lever 35 on the lower face of the latter is a retention head 38 fixed, at one end, to a cable 13 which has previously passed through a tensioning detent support 57 screwed to the upper end of the supports 25 and 25' by means of screws 50, in the rear part of the housing 19.

This same end of the lever 35 is also stressed by a vertical spring 58 fastened, at its upper end, to the lever 35 by means of a pin 39 and, at its lower end, by means of a pin 41 to a vertical screw 40, the lower end of which is fixed by means of a nut 43 to a return support 42, itself fixed to the supports 25 and 25' by means of screws 48.

The same end of the lever 35 comes in contact, via its lower face, with the end of a retention finger 44, the other end of which is connected, by way of a duct made in its support, to an electromagnet 45 located in the rear part of the control housing 19.

The support 47 is common to the four electromagnets used in the housing 19, and it is fixed to the supports 25 and 25' by means of screws 51, each electromagnet 45 being fixed to the support by means of screws 46. The axle 28 passes through the levers 35 via a duct 52 located near their centre, five spacers 36 surrounding it in order to keep the levers 35 in place.

Figures 5A, 5B, 5C, 5D:
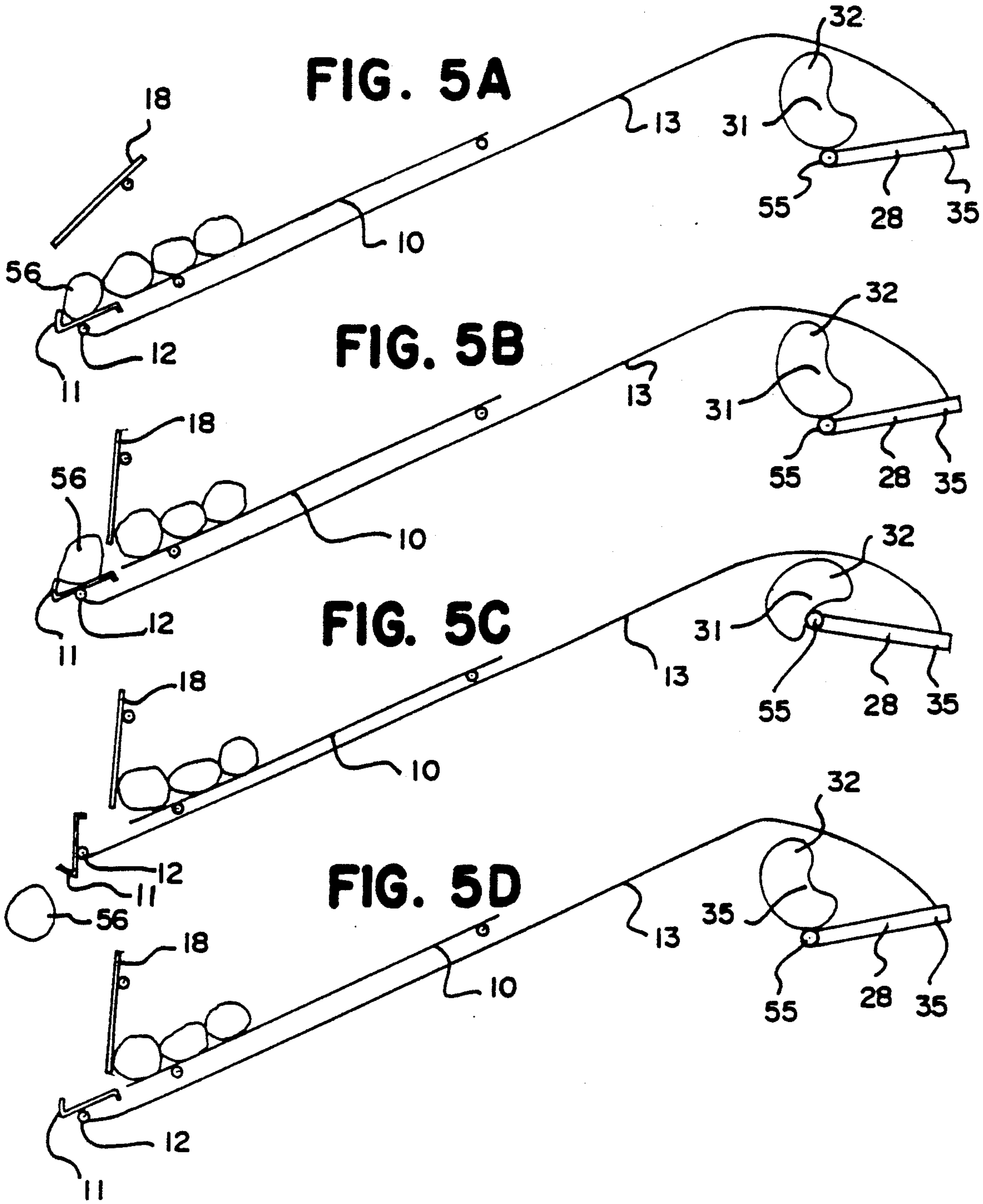

Referring to FIGS. 5*a* to 5*d*, the various operating steps for the discharge of the article can be seen. FIG. 5*a* shows the machine at rest, the retaining tongues 18 being raised, and the rocker 11 and the levers 35 being in the position of rest.

After the user has made his selection from the four possible articles, he inserts the appropriate sum in the machine, thus causing the energization of the electromagnet 23 and the electromagnet 45 corresponding to the rocker 11 on which the desired article is arranged, the other electromagnets 45 not being energized. The electromagnet 23 causes the rack 21 to rise and thereby pivot the toothed pinions 20 and the axles 16 and 17 in the anti-clockwise direction, turning the retaining tongues 18 down against the article located at the rear of the article 56 arranged on the rocker 11. The energized electromagnet 45 causes the retraction of the corresponding retention finger 44 which is therefore no longer in contact with the lever 35 associated with it. The other levers 35 remain in contact with the retention fingers 44 associated with them (see FIG. 5*b*).

After a very short interval of time, the motor 30 starts up, causing the rotation of the cams 32 against which the rollers 55 bear. In the concave part of the cam 32, the roller 55 corresponding to the energized electromagnet 45 remains bearing against the cam 32 by means of the force of the spring 58 which causes the corresponding lever 35 to pivot in the clockwise direction about the axle 28, thus pulling the corresponding cable 13 downwards. This brings about the pivoting of the corresponding rocker 11 about its axle 12 and the fall of the article 53 into the container 37, this taking place while the articles located behind the article 56 remain retained by the tongues 18. The other levers 35 remain stationary because they are still in contact with the corresponding retention fingers 44 which prevent any rotation in the clockwise direction about the axle 28 (see FIG. 5*c*).

The rotating cams 32 subsequently return to the position of rest, and the roller 55 corresponding to the energized electromagnet 45 remains in contact with the corresponding cam 32 and returns to its initial position, thereby causing the rotation of the lever 35 in the anti-clockwise direction by means of the spring 58, the effect of this being to return the corresponding table 13 and the corresponding rocker 11 to their respective positions of rest (FIG. 5*d*).

Finally, the last phase involves cutting off the supply of electricity, thus causing the rack 21 to return to the position of rest under the effect of the spring 24, thereby pivoting the toothed pinions 20 and therefore the axles 16 and 17 which raise the tongues 18. When these tongues 18 are raised, the products arranged on the plate 10 corresponding to the rocker 11 which has just tilted slide in such a way that the article 56 is immediately replaced on the rocker 11. The de-energization of the electromagnet 45 causes the retention finger 44 to return to the position of rest under the effect of a spring (not shown), the retention finger 44 coming into contact with the corresponding lever 35 once again.

In particular, the retaining tongues 18 shown in the accompanying FIG. 1 can be replaced by a set of two or three vertical tongues uniformly spaced above each rocker.

I claim:

1. An automatic dispenser for discrete items, comprising:

a plurality of inclined plates supported by first horizontal axles fixed to two sets of two vertical supports which are fixed to side walls of a frame of the dispenser and of which a first set is located in front of a second set, each inclined plate being extended by a rocker supporting the item to be dispensed, each rocker being fixed, via its lower face, with a second horizontal axle connected by means of a cable to a control unit located in the dispenser, the cable and the control unit being adapted to pivot the rocker about the axle; and above each rocker, a retaining tongue fastened to a horizontal axle which is mounted pivotably on the first supports and which is fixed, at one end, to a toothed pinion located between the frame and the support and engaging with a rack extended in its upper part by a cylindrical rod, having an end which is seated in an electromagnet fixed to the support, the retaining tongue adapted to retain the item located immediately behind that situated on the rocker during dispensing of the item located on the rocker, the control unit and the electromagnets being subject to an electronic control to actuate rockers and retaining tongues in such a manner that the retaining tongue prevents motion of items into the rocker when the rocker pivots, the retaining tongue being lowered immediately before the rocker supporting the selected item pivots in order to free the item which falls into a container accessible to the user.

2. An automatic dispenser according to claim 1, including four inclined plates separated, by means of a set of two middle supports, into two rows of two plates, one of which is positioned above the other, and retaining tongues positioned adjacent each rocker in a manner preventing movement of items into the rocker.

3. An automatic dispenser according to claim 1 wherein the retaining tongue includes two elongated members joined together in a V-shape and fastened to the horizontal axle above each rocker, wherein the angle between the elongated members is adjustable.

4. An automatic dispenser for discrete items, comprising:

an inclined plate, having a higher end and a lower end, and adapted to support a plurality of items thereon;

a rocker pivotably mounted at the lower end of the inclined plate, for supporting at least one of the items and arranged so that items supported on the inclined plate will tend to slide into the rocker;

means for changing the position of the rocker from a first position supporting an item to a second position causing the item to fall out of the rocker;

a retaining tongue mounted on a horizontal axle, disposed adjacent the rocker and movable from a first position restraining movement of an item on the inclined plate into the rocker, to a second position permitting movement of the item into the rocker; and control means for coordinating the movement of the rocker and the retaining tongue so that, in a cycle of operation, the retaining tongue moves into its first position, and then the rocker moves from its first position to its second position to release an item and then returns to its first position, and then the retaining tongue moves to its second position to allow a second item to move from the inclined plate into the rocker.

5. An automatic dispenser according to claim 4, wherein the horizontal axis is fixed to a toothed pinion and further comprising rack means adapted to engage the toothed pinion, including a rod extending from the rack means and having an end seated in an electromagnet, the retaining tongue being selectably movable through the rack means by means of energizing and de-energizing the electromagnet.

6. A dispenser according to claim 4, wherein the means for changing the position of the rocker includes a cable attached at one end to the rocker to cause pivoting of the rocker when the cable is moved, and at its other end to a means for moving the cable a preselected distance.

7. A dispenser according to claim 6, wherein the means for moving the cable a preselected distance includes a lever, having a first end attached to an end of the cable, and a rotatable cam, engaging the lever so that when the cam is rotated, the lever is displaced, thereby moving the cable a preselected distance.

8. A dispenser according to claim 7, wherein the control means further includes means for causing the rotation of the cam.

9. A dispenser according to claim 4, being electrically operated and wherein the rocker will remain in its first position and the retaining tongue will remain in its second position when no electricity is supplied to the dispenser.

10. A dispenser according to claim 4, wherein the retaining tongue includes two elongated members joined together in a V-shaped and wherein the relative angle therebetween is adjustable.

11. A vending machine having a plurality of selectably-operable automatic dispensers, each dispenser comprising:

an inclined plate, having a higher end and a lower end, and adapted to support a set of items thereon;

a rocker pivotably mounted at the lower end of the inclined plate, the rocker being adapted to support at least one of the set of items, and so arranged that items supported on the inclined plate will tend to slide into the rocker;

means for changing the position of the rocker from a first position supporting an item and a second position causing an item to fall out of the rocker;

a retaining tongue mounted on a horizontal axle, disposed adjacent the rocker and adapted to be movable from a first position restraining the movement of an item on the inclined plate into the rocker, and a second position permitting the movement of an item into the rocker; and control means for coordinating the motion of the rocker and the retaining tongue so that, in a cycle of operation, the retaining tongue moves into its first position, and then the rocker moves from its first position to its second position to release an item and then returns to its first position, and then the retaining tongue moves to its second position to allow a second item to move from the inclined plate into the rocker.

12. A vending machine according to claim 11, wherein in each dispenser the horizontal axle is fixed to a toothed pinion and further including rack means adapted to engage the toothed pinion, including a rod extending from the rack means and having an end seated in an electromagnet, the rack retaining tongue being selectably movable through the rack means by means of energizing and de-energizing the electromagnet.

13. A vending machine according to claim 11, wherein the means for changing the position of the rocker in each dispenser includes a cable attached at one end to the rocker in such a manner as to cause pivoting of the rocker when the cable is moved, and at its other end to a means for moving the cable a preselected distance.

14. A vending machine according to claim 13, wherein the means for moving the cable a preselected distance in each dispenser includes a lever, having a first end attached to one end of the cable, and a rotatable cam engaging the lever so that, when the cam is rotated, the lever is displaced, thereby moving the cable a preselected distance.

15. A vending machine according to claim 14, wherein the control means further includes means for causing the rotation of the cam.

16. A vending machine according to claim 11, wherein each dispenser operates by electrical means, and wherein the rocker will remain in its first position and the retaining tongue will remain in its second position when no electricity is supplied.

17. A vending machine according to claim 14, wherein the cams for the various means for changing the position of the rockers of the corresponding dispensers are arranged coaxially, and wherein each means for changing the position of the rocker further includes a selectably-operable retention finger disposed adjacent the lever, the retention finger being adapted to remain in a position restraining the motion of the lever when the particular dispenser within the vending machine is not in use, and to be movable to a position permitting motion of the lever when the particular dispenser is activated.

18. A vending machine according to claim 12, wherein at least two of the plurality of dispensers share a common rack means.

19. A vending machine according to claim 11, wherein at least one retaining tongue includes two elongated members arranged in a V-shape, the relative angle therebetween being adjustable.

20. A method for selectably dispensing items disposed on an inclined plate, comprising the steps of:

providing a pivotably-mounted movable rocker at a lower end of the inclined plate, the rocker being adapted to hold at least one item, whereby items on the plate tend to move toward the rocker;

providing a movable retaining tongue adjacent the rocker, for restricting movement of items from the inclined plate to the rocker;

moving the retaining tongue to a position preventing the movement of items into the rocker;

pivoting the rocker to a position for causing the item in the rocker to fall out;

pivoting the rocker to a position for holding at least one item; and then moving the retaining tongue to a position for permitting the movement of items into the rocker.

* * * * *